UNITED STATES PATENT OFFICE 2,336,308

PARASITICIDE

Frank B. Smith, George E. Lynn, and Fred W. Fletcher, Midland, Mich., assignors to The Dow Chemical Company, Midland, Mich., a corporation of Michigan No Drawing. Application June 20, 1941, Serial No. 398,970

4 Claims. (Cl. 167—30)

This invention relates to parasiticides and is particularly concerned with compositions comprising hydroxy-sulfo-azo-aromatic compounds and their alkali metal salts as active toxicants.

The lead, magnesium, and calcium arsenates have long been employed as stomach poisons for inclusion in agricultural spray materials. Residues of such toxicant mixtures deposited in and on fruit and vegetables are sufficiently hazardous to humans and higher animals that the use of the arsenates is frequently impractical. Furthermore, legislation regulating lead and arsenic tolerances has necessitated washing prior to the marketing of arsenic sprayed garden and orchard produce which greatly increases the ultimate cost of parasite control. In view of the foregoing, the development of new parasiticides and particularly stomach poisons is desirable.

We have discovered that certain hydroxy-sulfo-azo-aromatic compounds are effective stomach poisons and may be conveniently substituted for the metallic arsenates in agricultural spray and dust compositions. Among the compounds which have been found particularly useful are those having the formula:

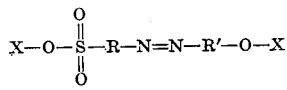

wherein R and R' each represents an aromatic radical, and each X represents hydrogen or an alkali metal. A preferred group of compounds are those having the formula:

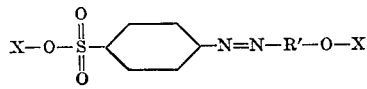

wherein R' represents an aromatic radical of the benzene series, and X is as defined above. For purposes of convenience these compounds are hereinafter referred to as "azo-sulfonic acid compounds."

These azo-sulfonic acid compounds, while comparable with the arsenates in toxicity to many plant parasites, have the added advantages of being compatible with common insecticidal materials with which the arsenates cannot be used, of being less toxic to both plants and humans than the arsenates, and of oxidizing on prolonged exposure to air, moisture, and soil bacteria so as not to accumulate in objectionable concentrations in soil adjacent to sprayed trees and plants.

In carrying out the present invention, the azo-sulfonic acid compound may be incorporated into either spray or dust compositions as desired. For example, such toxicant may be finely ground or otherwise comminuted and thereafter dissolved or dispersed in water to form a parasiticidal spray. In such embodiment of the invention, suitable wetting and dispersing agents may be incorporated with the toxicant before, during, or after the step of comminution. Also inert solid or liquid carriers may be mixed with the toxicant to form concentrates adapted to be subsequently employed in spray and dust compounding. By operating in this fashion, the concentrate may be obtained as a dust, paste, or solution depending on whether a finely divided solid, a liquid non-solvent, or a solvent for the azo-sulfonic acid compound is employed.

Similarly the new toxicants may be compounded directly with a solid carrier to form finely divided dust mixtures adapted to be employed without further modification in the control of agricultural pests. This may be accomplished by grinding the toxicant with the carrier to the desired state of fineness. An alternate method useful in the preparation both of toxicant concentrates and of dusting compositions comprises dissolving or dispersing the toxicant in a suitable solvent, e. g., acetone, methanol, ethanol, etc., wetting the finely divided inert carrier with the resultant product, and thereafter evaporating the solvent out of the mixture.

Representative of the finely divided solid carriers which may be employed in the compositions as described above are diatomaceous earth, bentonite, talc, volcanic ash, gypsum, walnut shell flour, wood flour, fuller's earth, kieselguhr, etc. Suitable wetting and dispersing agents include sodium lauryl sulfate, dried sulfite waste liquor, salts of alkyl-phenylphenol-sulphonic acids, hydroxy-alkyl ethers of phenols, and the like.

The amount of the azo-sulfonic acid compound employed in any given composition is dependent upon the exact compound and form of composition concerned, the nature of the insect to be destroyed, and the tolerance of the host plant for the toxicant. Concentrates may conveniently contain up to 80–85 per cent by weight of the toxicant compound. The percentage of toxicant employed in spray compositions is preferably between about 0.1 and 3 per cent by weight. In dusting preparations, from 0.5 to 5 per cent by weight is suitable.

The toxicants with which the present invention is concerned may be prepared by reacting a diazotized aromatic amino-sulfonic acid with a mixture of free alkali and a water soluble phenolate in water solution. The free alkali is employed in amount sufficient to neutralize acid formed during the reaction and preferably to form the di-alkali metal salt of the hydroxy-sulfo-azo-aromatic compound obtained as the product of reaction. Equimolecular amounts of diazotized aromatic amino-sulfonic acid and phenolate give the desired product in good yield. A minimum of one mole of alkali is required and preferably at least 2 moles employed per mole of azo compound. The reaction temperatures may vary from the freezing temperature of the reaction mixture to about 10° C. The crude hydroxy-sulfo-azo-aromatic product obtained from the reaction consists of a mixture of azo-sulfonic acid mono- and di-alkali metal salts. Such mixture may be employed in parasiticidal compositions without further purification. If desired, the free acid may be obtained in substantially pure form by dissolving the crude salt mixture in water, acidifying with concentrated hydrochloric acid, and filtering off the free acid as precipitated. The residue from such filtration is preferably washed with hydrochloric acid to remove inorganic salts of reaction, and the washed residue oven-dried to drive off hydrogen chloride. The mono- or di-salt may be prepared from the free acid by reaction of the latter with alkali metal hydroxide.

In a representative preparation 1000 grams of sulfanilic acid (containing 1 mole of water of crystallization) was stirred into 6 liters of water. 300 grams of sodium carbonate was added thereto and stirring continued until a clear solution resulted. This solution was cooled with 12 quarts of pulverized ice and 1905 grams of 12 normal hydrochloric acid added thereto with stirring. 380 grams of sodium nitrite was dissolved in 1 liter of water and added portionwise over a period of 10 minutes to the reaction mixture, the temperature of the mixture being maintained at below 0° C. throughout the addition. The resulting diazotized mixture was added portionwise with stirring over a period of one-half hours to a solution consisting of 1310 grams of the sodium salt of 2.4.5-trichlorophenol (1 molecule of water of crystallization), 460 grams of 96 per cent sodium hydroxide, and 20 liters of water. The temperature of the reaction mixture was maintained at below 3° C. throughout the addition. The mixture was then stirred and warmed to 88° C., cooled to 10° C., and filtered to obtain 976 grams of a mixture of the di-sodium and mono-sodium salts of 2-hydroxy-3.5.6-trichloro-azobenzene-4′-sulfonic acid. This product was in the form of an orange-brown powder, somewhat soluble in cold water, and insoluble in carbon tetrachloride. The product decomposed before reaching a true melting point. A portion of this product was dissolved in water, acidified with concentrated hydrochloric acid, and the precipitated acid recovered by filtration. The residue was washed and dried to obtain the free acid melting at 128°–130° C.

The following examples are illustrative but are not to be construed as limiting the invention.

*Example 1*

20 parts by weight of the mixed mono- and di-sodium salts of 2-hydroxy-3.5.6-trichloro-azobenzene-4′-sulfonic acid, as described in the foregoing paragraphs, and 80 parts by weight of diatomaceous earth were ground together to form a dust compositon adapted to be employed as a concentrate for the preparation of aqueous spray compositions. 5 pounds of this product containing 1 pound of the toxicant was dispersed in 100 gallons of water and applied for the control of Colorado potato beetle larva. On bean foliage, a 62 per cent kill of the larva was obtained in 3 days. No injury to the bean foliage resulted. In a control determination 3 pounds of acid lead arsenate was dispersed in 100 gallons of water to form a spray which gave a kill of 87 per cent of the larva in 3 days. 10 per cent burning of bean foliage resulted from this treatment.

*Example 2*

In a similar determination 5 pounds of the toxicant-diatomaceous earth mixture in 100 gallons of water was applied for the control of Mexican bean beetle larva. On soya bean foliage this treatment gave a kill of 56 per cent in 3 days with no injury to the beans. Lead arsenate at 3 pounds per 100 gallons gave a kill of 24 per cent in 3 days and an injury of 10 per cent to the host plant.

*Example 3*

20 parts by weight of 2-hydroxy-3.5.6-trichloro-azobenzene-4′-sulfonic acid, 10 parts of bentonite, 0.5 part of 4-tertiarybutyl-phenoxy ethanol, and 55 grams of anhydrous calcium sulfate were mixed together and slurred with sufficient water to give a thick paste of plaster-like consistency. This paste was allowed to set and was thereafter ground to obtain a dust composition in which the toxicant was intimately dispersed with and occluded by the matrices of gypsum crystals. Sufficient of this product was dispersed in water to give a concentration of 3 pounds of the toxicant per 100 gallons of water. The composition was then applied for the control of codling moth larva and found to give a kill of 72 per cent. Lead arsenate at 3 pounds per 100 gallons gave a kill of 60 per cent of the codling moth larva.

Other compounds which may be similarly employed include 3-chloro-4-hydroxy-5-phenyl-azobenzene-4′-sulfonic acid, 4-hydroxy-3-phenyl-azobenzene-4′-sulfonic acid, 3.5-dichloro-2-hydroxy-azobenzene-4′-sulfonic acid, 5-chloro-2-hydroxy-3-phenyl-azobenzene-4′-sulfonic acid, 2-hydroxy-5-tertiarybutyl - azobenzene - 4′ - sulfonic acid, 3-chloro-2-hydroxy-5-tertiarybutyl-azobenzene-4′-sulfonic acid, 3-chloro-5-n-hexyl-2-hydroxy-azobenzene-4′-sulfonic acid, 3-chloro-4-hydroxy-2-isopropyl-5-methyl-azobenzene - 4′-sulfonic acid, 3-chloro-6-hydroxy-2-isopropyl-5-methyl-azobenzene-4′-sulfonic acid, 2-hydroxy-3.5-di-isopropyl-azobenzene-4′-sulfonic acid, 2-hydroxy-3.5.6-trichloro-4′-(4-sulfo-phenyl)-azobenzene, 1-(2-hydroxy-3.5.6 - trichloro - phenyl - azo)-naphthalene-4-sulfonic acid, and the mono- and di-sodium and potassium salts thereof.

We claim:

1. An insecticidal composition comprising as an active toxicant a compound having the formula:

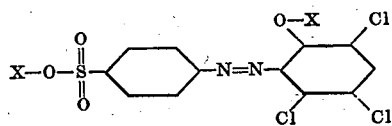

wherein each X is a member of the group consisting of hydrogen and the alkali metals.

2. An insecticidal composition comprising as an active toxicant 2-hydroxy-3.5.6-trichloro-azobenzene-4′-sulfonic acid.

3. An insecticidal composition comprising as an active toxicant a sodium salt of 2-hydroxy-3.5.6-trichloro-azobenzene-4′-sulfonic acid.

4. An insecticidal composition comprising as an active toxicant a compound having the formula

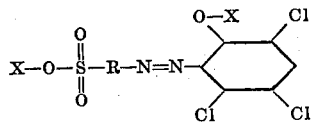

wherein each X is a member of the group consisting of hydrogen and the alkali metals, and R represents an aromatic radical.

FRANK B. SMITH.
GEORGE E. LYNN.
FRED W. FLETCHER.